July 29, 1952

J. A. KARNS 2,604,661

APPARATUS FOR MOLDING COVERS UPON SHAFT MEMBERS

Filed Aug. 27, 1948

INVENTOR.
JAMES A. KARNS
BY Willard D. Eakin
Attorney

INVENTOR.
JAMES A. KARNS
BY Willard D. Eakin
Attorney

Patented July 29, 1952

2,604,661

UNITED STATES PATENT OFFICE 2,604,661

APPARATUS FOR MOLDING COVERS UPON SHAFT MEMBERS

James A. Karns, Akron, Ohio, assignor to Fawick Flexi-Grip Company, Akron, Ohio, a corporation of Ohio Application August 27, 1948, Serial No. 46,378

4 Claims. (Cl. 18—36)

This invention relates to apparatus for molding a covering upon an end portion of a shaft member, as in the molding of a substance such as a natural or synthetic rubber composition to provide a hand grip upon the shaft of a golf club.

Its chief objects are to provide in an improved manner for accurately centering the shaft in the molded grip, for example; to provide in an improved manner for preventing longitudinal movement of the shaft in the mold under the force of the molding pressure against the end face of the shaft when the grip is molded with an end wall overlying the end of the shaft; and to provide facility and economy of operation.

Figure 1:
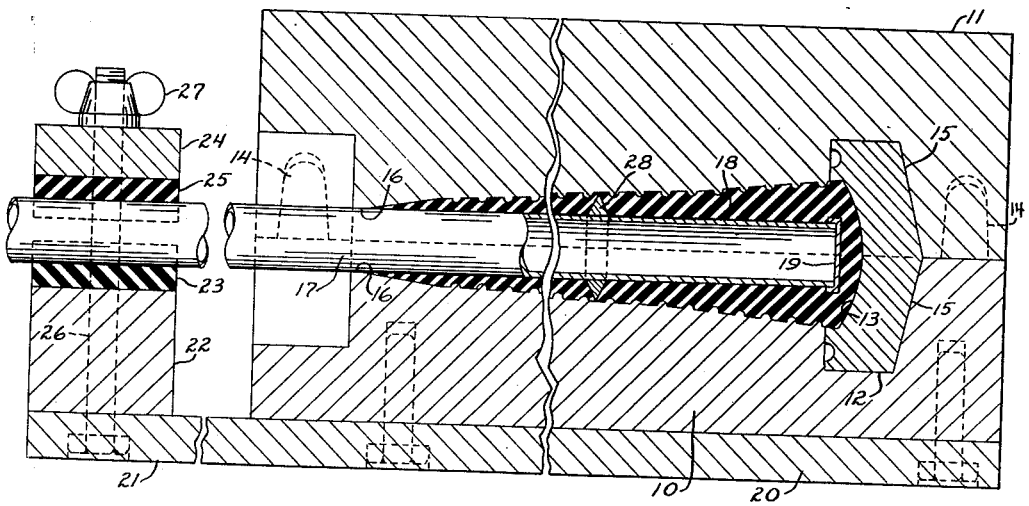
Fig. 1 is a longitudinal section of molding apparatus embodying and adapted for the practice of my invention in its preferred form as applied to the molding of golf-club hand grips, with the work in place therein, parts being broken away for shortening of the figure.
Figure 2:
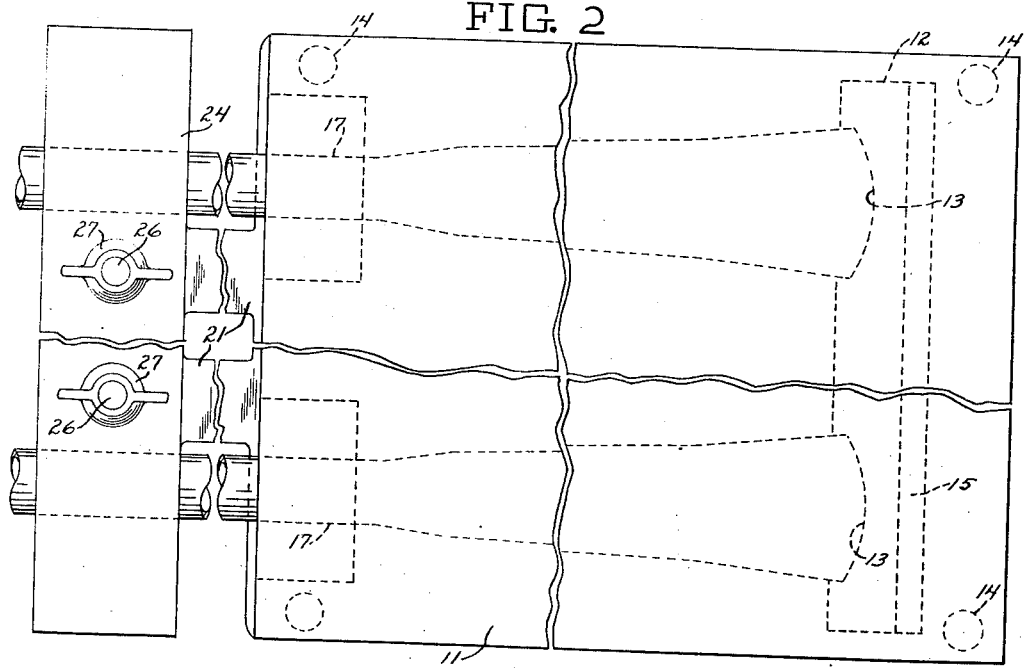
Fig. 2 is a plan view of the same, with parts similarly broken away, showing the use of the invention in a multi-cavity mold assembly.

Referring to the drawings, the mold itself comprises a lower section 10, an upper section 11, each formed with a plurality of cavities mating respectively with cavities in the other section, and a third section 12 in the form of a wedging bar which extends past all of the mold cavities and at the position of each is formed with a molding recess 13 for molding the end face of the grip, overlying the end of the shaft.

The mold sections 10 and 11 are provided with the usual dowels, as at 14, 14, and with wedging faces coacting with wedging faces on the bar 12, as at 15, 15, for forcing the bar toward the work and accurately positioning it as the mold is closed.

At the other end of each mold cavity the sections 10 and 11 are formed with respective semicircular stock confining lands 16, 16, preferably of such narrow width, lengthwise of the shaft 17, and if they mar the finish of the shaft, in the closing of the mold, the marred area will be of such small extent as to be covered by the usual ferrule or wrapped binding applied to the adjacent end portion of the grip, 18.

Thus the mold is of such length as to enclose only a little more than the part of the shaft 17 that is to receive the molded grip 18, and as the lands 16 cannot firmly grip the shaft until the mold is fully closed, the molding pressure against the end face of the shaft, which in this instance is the face of a metal cap 19 closing the end of a tubular steel shaft, can move the shaft axially out of its proper position unless provision is made against such displacement of the shaft.

As the shaft of a golf club has considerable flexibility, and the head of the club is off-set from the shaft and oddly shaped, and is at a long distance from the mold, the shifting of the shaft by the molding pressure can not be very well prevented by merely providing an abutment for the club-head, and this is true even as to a socketed abutment in view of the fact that club-heads differ in size and shape.

I have solved this part of the problem of keeping the shaft in proper position by providing means for frictionally gripping the shaft, without damaging it, at a short distance from the mold.

For this purpose the present assembly comprises a strong metal plate 20 secured by suitable screws to the lower face of the lower mold section 10 and formed with arms 21, 21 projecting beyond the mold and having mounted upon their outer ends a bridge block 22 having for each golf club a rubber chuck-lining block 23 seated in a socket in the upper face of the bridge block, the rubber block being formed in its upper face with an arcuate groove to receive the shaft of the club.

A cap plate 24 extends the length of the bridge block 21 and has for each golf club a rubber chuck-lining block 25 seated in a socket formed in the lower face of the cap plate, the rubber block being formed in its lower face with an arcuate groove for receiving the shaft of the club.

For securing these several parts in assembled relation, with the rubber blocks securely clamping a set of golf-club shafts, bolts 26, 26 extend through the arms 21, respectively and through the bridge block 22 and the cap plate 24 and are provided with wing nuts 27, 27 on their upper ends.

Preferably the rubber blocks 23 and 25 are secured in their respective sockets by being vulcanized therein or by the use of a suitable adhesive or both.

While the parts just described effectively hold the gripped parts of the shafts in position, against both lengthwise and lateral displacement, it is important that the part of each shaft within the mold be brought to accurately centered position in the grip 18 as the latter attains its final molded shape, in spite of unbalanced forces in the stock being pressed laterally against the shaft, and a simple and inexpensive way of so centering the part of the shaft that is within the mold is provided by slipping onto or otherwise mounting upon the shaft, at a suitable stage of its preparation, a ring 28, which can be either endless or transversely split, and which is of such radial dimension in cross-section as to be contacted or nearly contacted by the molding faces of the sections 10 and 11 as they reach fully closed position.

The ring remains in the grip as a part of the finished club, and can be of hard rubber or the like, or of a hard fiber composition, or can be of metal, and, if desired, it can be welded or otherwise secured to the shaft before the molding operation is performed.

Preferably it is of triangular cross-section, as shown, so as to have a wide base against the shaft for stability while being narrow at its outer periphery, so that it will not cause the grip to have a wide non-resilient zone.

For long grips more than one of the rings can be used, suitably spaced apart, and they preferably are mounted at positions beyond the region in which the grip is grasped by the user.

Figure 3:
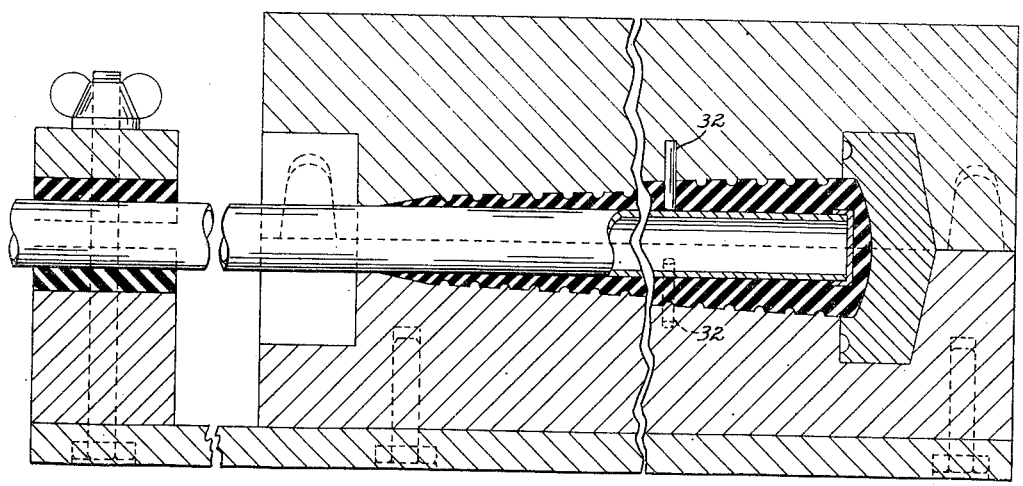
Fig. 3 is a longitudinal section showing a modification.

In the modification shown in Fig. 3 the shaft is centered by projections 32, 32 on the molding faces of the sections 10 and 11, adapted to contact or nearly contact the shaft as the sections fully closed position. In this embodiment, as in that of Fig. 1, the grip can be integrally formed with an impervious cap portion or end wall on the end face of the shaft.

The use of the bar 12, wedged toward the club shafts, makes it feasible to mold lettering or other indicia on the end face of the grip with proper direction of withdrawal of the bar from the work after the molding operation, which is especially important when a relatively hard-setting stock is used for the cap portion or end wall of the grip, and especially if the lettering or the like is molded either deeply or in high relief.

Forming the end wall of a stock that sets to a harder condition than that of the rest of the grip makes unnnecesary a separately applied plug or finishing button for the end of the grip, and the above described gripping and centering of the shaft are especially important when two stocks of different hardnesses are thus used.

Other modifications are possible within the scope of the appended claims.

I claim:

1. Apparatus for molding a covering upon an end portion only of a substantially straight shaft member, said covering extending more than 180 degrees about the shaft, said apparatus comprising molding members which, with the shaft, when the mold is fully closed, define a completely enclosed chamber having only the size and shape of the cover and constitute the only stock-contacting and deforming members of the assembly, said mold members having stock-confining margins at one end of the cavity shaped to fit the said shaft member; and, for positioning the end portion of the shaft member in the said chamber in the completion of the closing of the mold, spacer means having a span of more than 180 degrees about the shaft, and of fixed radial dimension, interposed between the shaft member and a plurality of the molding members, said spacer means being shaped to engage the external side face only of the shaft and postioned within the length of, and at a substantial distance from each end of, the molding faces of said molding members.

2. Apparatus as defined in claim 1 in which projections on, and rigid with, respective ones of the molding members are the spacer means defined.

3. Apparatus as defined in claim 1 in which the defined spacer means is unattached with relation to the molding members.

4. Apparatus as defined in claim 1 including means fixed in relation to one of the molding members for gripping the shaft at a substantial distance from the mold cavity before the full closing of the mold and constituting the only means for resisting endwise thrust of the shaft by pressure of the stock against the end face of the shaft within the mold cavity.

JAMES A. KARNS.

REFERENCES CITED

The following references are of record in the file of this patent:

UNITED STATES PATENTS

| Number | Name | Date |
| --- | --- | --- |
| 222,229 | Beals et al. | Dec. 2, 1879 |
| 1,411,672 | Schrank | Apr. 4, 1922 |
| 1,582,021 | Geyer | Apr. 20, 1926 |
| 2,064,435 | Loeffler | Dec. 15, 1936 |
| 2,256,769 | Amrine | Sept. 23, 1941 |

OTHER REFERENCES

Ser. No. 391,198, Chapuis (A. P. C.), published June 15, 1943.